(12) United States Patent
Dazet

(10) Patent No.: US 8,816,916 B2
(45) Date of Patent: Aug. 26, 2014

(54) RADOME AND DEVICE FOR ATTACHING SAID RADOME TO AN AIRCRAFT

(75) Inventor: Francis Dazet, Tournous-Darre (FR)

(73) Assignee: Airbus Operations S.A.S., Toulouse (FR)

( * ) Notice: Subject to any disclaimer, the term of this patent is extended or adjusted under 35 U.S.C. 154(b) by 327 days.

(21) Appl. No.: 13/395,241

(22) PCT Filed: Sep. 10, 2010

(86) PCT No.: PCT/FR2010/051896
§ 371 (c)(1),
(2), (4) Date: May 8, 2012

(87) PCT Pub. No.: WO2011/030078
PCT Pub. Date: Mar. 17, 2011

(65) Prior Publication Data
US 2012/0212391 A1  Aug. 23, 2012

(30) Foreign Application Priority Data

Sep. 11, 2009  (FR) ...................................... 09 56267

(51) Int. Cl.
*H01Q 1/28* (2006.01)
*H01Q 1/42* (2006.01)
*B64C 1/00* (2006.01)
*B64C 1/12* (2006.01)

(52) U.S. Cl.
USPC ........... 343/705; 343/872; 244/119; 244/121; 244/131; 244/132

(58) Field of Classification Search
USPC ........... 343/705, 872; 244/119, 121, 131, 132
See application file for complete search history.

(56) References Cited

U.S. PATENT DOCUMENTS 5,820,077 A    10/1998  Sutliff et al.
2007/0045467 A1  3/2007  Jeanneau et al.

FOREIGN PATENT DOCUMENTS

EP    1 612 139    1/2006
WO    98 27800    6/1998

OTHER PUBLICATIONS

International Search Report issued on Dec. 13, 2010 in PCT/FR10/051896 filed on Sep. 10, 2010.

*Primary Examiner* — Robert Karacsony
(74) *Attorney, Agent, or Firm* — Oblon, Spivak, McClelland, Maier & Neustadt, L.L.P.

(57) ABSTRACT

The invention relates to a radome (1) for an aircraft, and more specifically to a device for connecting said radome to the structure of said aircraft. The radome that is the subject of the invention comprises a plurality of locking units able to bring together the opposing surfaces of the aircraft's fuselage (10) and the radome (1), each unit comprising:
  locking means (20) able to exercise a traction force on the surface of the fuselage, substantially normal to the surface, via attachment means;
  centering means able to withstand the shear forces substantially tangential to the opposing surfaces of the fuselage and radome;
  the locking means (20) are placed such that they are located inside the cone of resulting forces on the centering means so as to minimize the bending stresses generated by the assembly in the radome (1).

13 Claims, 4 Drawing Sheets

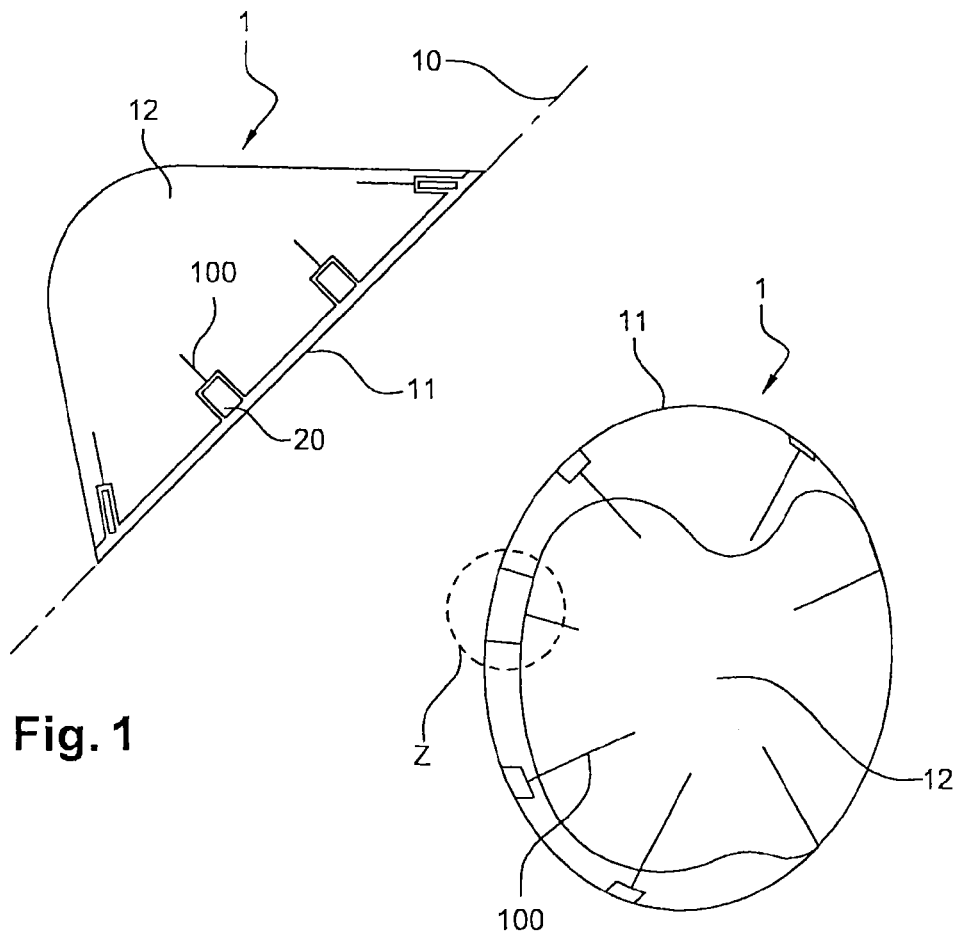
Fig. 1
Fig. 2
Detail Z
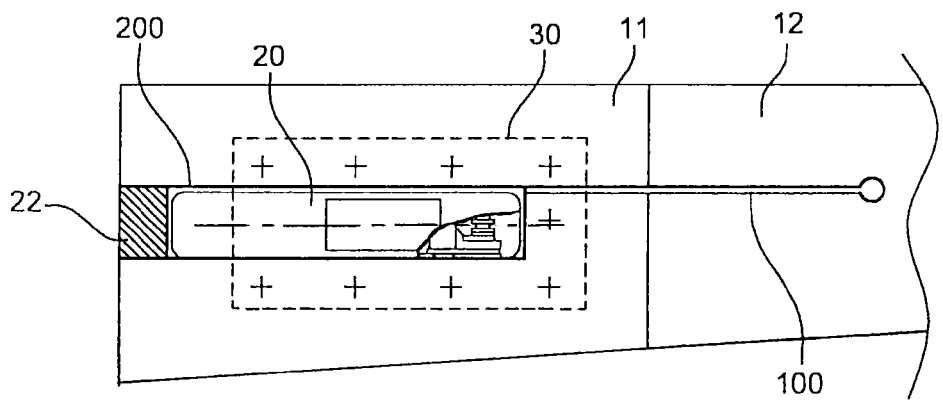
Fig. 3

RADOME AND DEVICE FOR ATTACHING SAID RADOME TO AN AIRCRAFT

The invention relates to a radome for an aircraft, and more specifically to a device for connecting said radome to the structure of said aircraft.

Most aircraft, and more specifically civil transport aircraft, include a radome located in the nose cone of the fuselage. In addition to its aerodynamic role, this radome also protects a radar. Consequently it is made of a material permeable to electromagnetic waves, generally a composite material. The part's functions introduce several constraints in its design and manufacture:

accessibility to the radar located under the radome means that the latter has to be a removable part and advantageously one that can be removed or retracted easily;
  its role protecting the radar and its position in an area particularly exposed to different types of impacts means that this part has to be particularly resistant and it must also be hermetic, just like its connection to the fuselage;
  its aerodynamic position in the nose cone means that it must match the shape of the fuselage perfectly to avoid any turbulence forming in the airflow, as a result of it not being perfectly even.

These requirements are contradictory in more than one way. For example, magnetic permeability favors manufacture in a composite material. However, the complexity of the shape and the definition of load-bearing plies suited to the constraint of resistance to impacts leads to complex deformations in the assembly after curing and difficulties adjusting the shape of the radome to that of the fuselage. This adjustment is even more complicated when there are double-curvature shapes or very rigid parts.

According to the prior state of the art, basically two methods of compromise between these various requirements are used. The first consists of incorporating a rigid metallic frame into the radome at the interface with the fuselage; the frame's shape is produced with precision and adjusts to the shape of the interface on the fuselage side. This configuration is costly, due to the precision of its manufacture, and the presence of the metal part has an adverse effect on the mass. However, the rigidity of this peripheral area allows opening mechanisms to be installed whose kinematics facilitate rapid access to the radar without removing the radome.

Another solution, described in European patent EP1642139 in the name of the applicant, consists of producing a flexible assembly interface, with no rigid part, connected to the fuselage by a plurality of fasteners distributed around the circumference. This configuration makes it possible to benefit from the flexibility of the interface to adapt it to the shape of the fuselage through the plurality of fasteners. On the other hand, compared to the first solution it takes longer to remove and/or open the radome because of the plurality of fasteners to be undone and re-done each time the radome is opened or closed. These fasteners are placed in great number, in particular to compensate for the radome's flexibility at the interface between it and the end of the fuselage.

The invention aims to remedy the deficiencies of the prior state of the art by proposing a radome whose composition cooperates with the fitting/opening device to provide an improved level of adjustment and evenness with the fuselage, retaining a possibility of rapid opening or removal with no disadvantage in terms of mass.

To this end, the invention proposes a radome for an aircraft; this radome comprises a plurality of locking units able to bring together the opposing surfaces of the aircraft's fuselage and the radome, each unit comprising:

locking means able to exercise a traction force on the surface of the fuselage, substantially normal to the surface, via attachment means;
  centering means able to withstand the substantially tangential shear forces to the opposing surfaces of the fuselage and radome;
  the locking means are placed such that they are located inside the cone of resulting forces on the centering means so as to minimize the bending stresses generated by the assembly in the radome.

Thus, by minimizing the bending stresses in the radome and in particular at the interface between the radome and the fuselage, the radome can be flexible for adapting with perfect evenness to the shape of the fuselage and the number of locking units can be reduced so that the time for fitting/removing said radome is not increased too much.

The invention can be implemented according to the advantageous embodiments described below, which may be considered individually or in any technically effective combination.

Advantageously the radome that is the subject of the invention comprises a longitudinal slot in its structure starting at the end interfacing with the fuselage.

Thus the flexibility of the interface can be increased.

According to a particularly advantageous embodiment the radome comprises a plurality of longitudinal slots in its structure, starting at the end of the interface with the fuselage and distributed around the circumference of this end; the locking units each comprise a rigid support surface fixed to the radome and spanning both edges of a slot.

Thus the presence of these slots makes it possible to confer flexibility in both shape and perimeter at the end of the radome forming the interface with the fuselage and thus obtain a perfect evenness and adjustment of the two structures even at the interface end of said radome.

The number of slots is determined by the ability to allow adjustment in both shape and perimeter of the end interfacing with the fuselage according to the shape, nature and rigidity of this end. In practice it is fixed by numerical simulations combined, if necessary, with prototype tests.

The locking units, one surface of which spans the edges of said slots, act as brackets and make it possible to ensure the interface's structural continuity and dissipate the force flows without passing by said slots once the interface is adjusted. Combining this structural role with the locking function means that the mass that would be added by specific load-bearing brackets in the presence of the slots, can be limited Advantageously, the radome that is the subject of the invention comprises, starting from the end interfacing with the fuselage, a monolithic peripheral area extending below each locking unit, the rest of the radome being formed of a honeycomb structure. This monolithic area, advantageously co-cured with the rest of the structure, results in rigidity to the end of the radome, thus allowing it to be held in place by a limited number of anchor points and simplified options for opening or retraction, in particular by hinges. Unlike the prior state of the art, this rigid peripheral area is not produced with special precision and can be adjusted to the fuselage thanks to the presence of the slots, which allows it to be produced economically.

This rigid peripheral area can be used advantageously to ensure the radome's hermetic sealing, in particular by realizing a groove in it receiving the end of a deformable seal fixed to the fuselage. Incorporating means that perform this sealing function in the thickness of the radome's wall makes it possible to bring the locking means closer radially to said wall and thus limit the parasite bending and sheer effects caused by the distance between the points of application of forces on these locking means and the radome's wall to which they are fixed.

Advantageously, the centering means consist of centering devices that fit in receptacles on the fuselage side when said radome is closed. In addition to the advantage of facilitating a repeatable positioning of the radome each time it is opened or closed, these centering devices withstand the shear stresses substantially parallel to the interface plane.

Thus, because the locks no longer perform the positioning function, said locks can be chosen from "quick-release" types known in the prior state of the art, especially traction hook locks, and allowing locking and unlocking with a single operation of a lever flush with the outside surface of the radome. They can therefore be unlocked from the outside of the radome, thus allowing easy access to the radar in a reduced service time. This type of lock presents high resistance in the locking axis but reduced resistance perpendicular to this axis, a reduced resistance compensated for by the presence of centering devices.

Advantageously the locking units are used to support said centering devices; this provides an advantage in terms of mass by limiting the number of parts, but above all it allows said centering devices to be brought closer to the attachment points of the locking devices, thus facilitating the bracing of the locking device and as a result the safety of said locking.

Advantageously at least two locking units comprise a device for pre-positioning the radome relative to the fuselage, consisting of a pin fitting into a washer made of elastomer. These devices make fitting the radome easier. The elastomer washers ensure the relative location and retention of the radome with respect to the fuselage before it is positioned and fixed in a secure way by centering devices on the fuselage. Incorporating this device in the locking units allows a saving of mass by limiting the number of brackets installed on the fuselage. Said units can either receive the pre-positioning pins or the elastomer washers, and this configuration can change from one unit to the next. If the dimensions or weight of the radome warrant this, four pre-positioning pins of this type are used.

Advantageously, at least two pins have a shape designed to allow the radome to be articulated along an axis substantially parallel to the interface plane. When the radome only comprises two pre-positioning pins, for preference these are of this type. They thus act as hinges for rapidly opening the radome without its removal. The lightness of the radome according to the invention allows this articulation to be realized in the elastomer washers without installing a bracket and frame for bearing such an articulation. As said pins are connected to rigid units, themselves fixed to the monolithic peripheral area, also rigid, these two attachment points are sufficient to keep the radome in an open position without risk of it being damaged due to its own weight.

The invention also concerns an aircraft comprising a radome corresponding to any one of the embodiments described above.

The invention will now be described more precisely in the context of its preferred non-limiting embodiments shown in FIGS. 1 to 11, in which:

FIG. 1 shows a lateral overview of the radome according to the invention;

FIG. 2 shows the radome according to the invention in a front view in perspective;

FIG. 3 is a detail view from above of the device connecting the radome to the structure of the aircraft;

Figure 4:
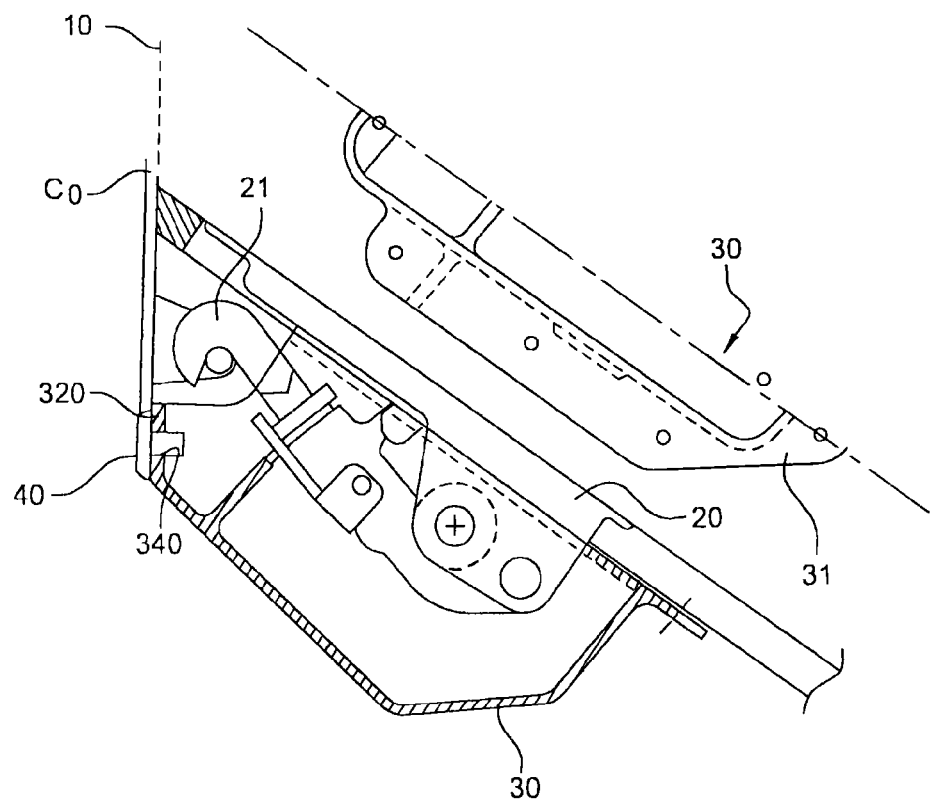
FIG. 4 is a cross-section view along a radial plane of the radome highlighting the locking device.

FIGS. 1 and 2: the radome according to the invention (1) comprises a double-curvature surface (12) made from a material permeable to electromagnetic waves, preferably a honeycomb type of composite. From the interface end (10), which is fixed to the aircraft fuselage, it comprises a rigid monolithic ring (11) extending to the positions of the locking devices (20). This rigid monolithic ring maintains said radome's consistency of shape, especially during its opening, for example during inspection or maintenance operations on the radar placed under the radome.

The rigidity of this ring (11) also means the radome can be kept fixed to the fuselage by a reduced number of fuselage anchoring and locking points. On the other hand, said ring's rigidity does not permit a perfect evenness and adjustment of the shape of the interface end (10) to the shape of the fuselage. In order to allow the radome's interface ring to be adjusted in shape and perimeter to the aircraft fuselage, slots (100) are realized in the radome's structure, starting from the interface end (10) and continuing on into the monolithic ring (11) and beyond. Said slots (100) are substantially perpendicular to the assembly interface; they thus enable both its shape and its perimeter to be adjusted.

FIG. 3: the slots (100) comprise two portions. A first portion (200), substantially rectangular and able to receive a lock (20), preferably a clamp type with toggle fastener, extends from the interface end over a sufficient length to allow the housing for the suitable locking device. This notch (200) is prolonged by a narrow slot (100).

The radome can be adjusted in shape and perimeter to the fuselage either directly on the aircraft for which the radome is intended or on a template. Advantageously, it is possible to use a female template on which the outer surface of the radome (1) is pressed at the level of the monolithic ring (11). The slots provide sufficient flexibility to perform the calibration by controlling the seating of the ring on the template along its entire perimeter. After calibration the locking units (30), FIGS. 3 and 4, are fixed onto the inner surface of the radome in line with the slots.

FIG. 4: the locking units comprise a base (31) sufficiently wide to span the lock placement notch (200) and the slot (100). Once the units are fixed, they make the ring (11) rigid in the annular direction and cancel the flexibility obtained through the slots and notches. The radome therefore retains the shape of the template.

The radome is then extracted from the template and the locks (20) are installed in their positions. A glued and resined wedge (22) is placed in front of each lock to close the notch (200), the slots (100) are closed with a polysulfide-based mastic or an epoxy resin loaded with short fibers.

As the base (31) of the locking units spans the slots (200, 100), once said units are fixed onto the radome the circumferential and longitudinal force flows pass by said units without stressing the slots (200,100). The units (30) are designed so as to resist these force flows. In order to favor this load transfer the monolithic portion (11), at the radome's interface end, is preferably extended under the bases of the locking units (31). For each locking unit, the base's seating on the radome is adjusted through a compensation calibration by interposing resin between the unit's base and its support surface on the radome.

Advantageously the locking units are made of a high-performance aluminum alloy chosen in the 7000 series and are obtained by machining. According to this example of realization, the locking units are in the form of substantially prismatic hollow elements occupying a volume of 500×300× 300 mm³. The typical thickness of the wall of said units is between 1.5 mm and 2.5 mm. The annular rigidity of such units plays a part in the radome's structural integrity, reinforcing the anchor points with the aircraft structure and thus making it possible to reduce the number of these anchor points. Typically, the number of anchorages of this type can be reduced to 8 for the radome of a wide-body airplane where the diameter of the interface end is 2 meters.

FIG. 4: the rigidity of the units is advantageously used to group together on these elements all the functions for centering and locking the radome on the aircraft structure.

According to an advantageous embodiment, the radome is connected to the aircraft by spherical centering devices (40) and latch hooks (21). Preferably both of these are connected to the aircraft structure by means of receptacle brackets (50), each comprising a conical receptacle (510), with a cone angle of γ/2, designed to receive the centering sphere (40) of the locking unit opposite, and a striated area (520) receiving the connection brackets for the hooks (51). The receptacle brackets (50) are, for example, made of titanium T40 and fixed to the aircraft structure by screws also made of titanium.

The spherical centering devices are preferably made of a malleable bronze-based material comprising copper, tin and lead having a low coefficient of friction with titanium and able to withstand static loads. The typical diameter of the spherical portion of the centering devices (40) is between 14 and 20 mm.

Figures 5, 6:
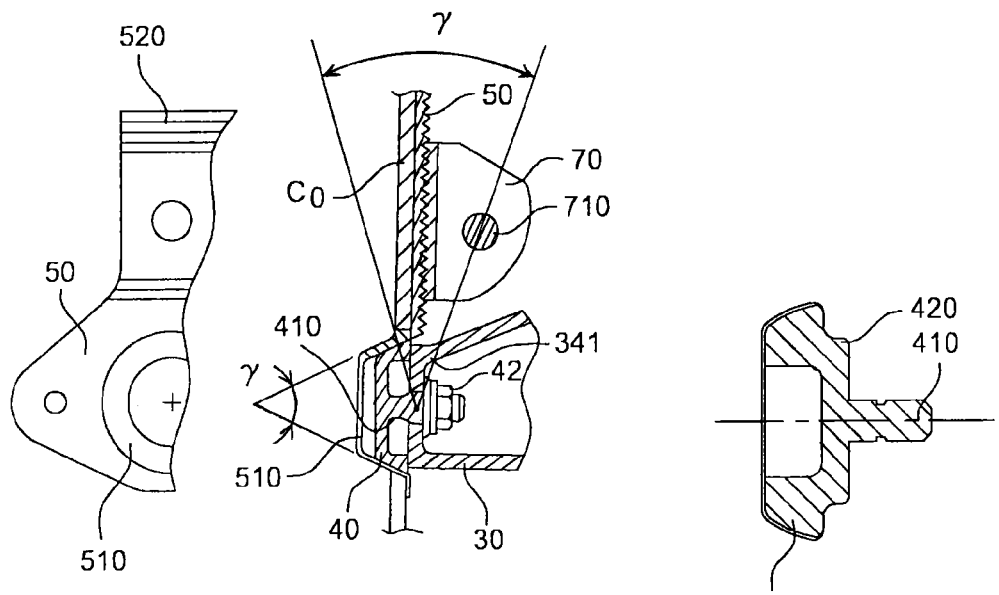
FIG. 5 is a detailed front and lateral view of the receptacle brackets fixed to the connection interface on the aircraft side.
FIG. 6 is a cross-section view of the spherical centering devices of the radome.

They are fixed to the ends of the units (30) by bolts. To this end, FIG. 6, the spherical portion of the centering devices is prolonged by a threaded pin (410), so as to form a shoulder (420) with the spherical portion of the centering device. The pin (410) is adjusted in a bore (340) at the end of the locking unit (30) on the side of the interface with the aircraft structure, and kept in position by a nut (42) screwed onto the end of this pin. The shoulder (420) of the centering device comes into contact with the front surface (320) of the locking unit (30). This front surface (320) is parallel to the assembly plane (10) of the radome and ideally included in this plane.

The connection bracket (70) for the hook is connected to the receptacle bracket (50) by means of a striated interface (520) that allows the radial distance of the locking pin (710) to be adjusted relative to the longitudinal axis of the radome. Advantageously, the hook's attachment point is placed as close as possible radially to the surface of the radome. In the longitudinal direction the locking pin (710) is placed as close as possible to the bearing surface (320) of the centering devices on the front surface of the units (30). Ideally, for a given unit, the longitudinal direction of the locking pin is located in the direction cone of the resultant of the forces over the centering sphere, FIG. 5. The summit of this cone of angle γ is placed on the intersection of the sphere's longitudinal axis with its bearing surface (320) on the unit. These positioning principles mean that the bending moments in the radome's structure can be reduced and thus the mass of the attachment devices can be reduced. From a practical point of view, this condition is met if the longitudinal distance between the spheres' bearing surface (320) on the locking unit and the hook's reception pin (710) is less than 30 mm.

The spheres (50) ensure the radial positioning and the transmission of the radial and annular forces between the aircraft structure and the radome. The locks (20), by means of hooks, ensure the longitudinal attachment and compress the interface between the radome and the aircraft structure so as to ensure hermeticity and aerodynamic continuity. Bringing the attachment pin (710) of the hooks longitudinally closer to the bearing surface (320) of the spheres on the units makes it possible to obtain the bracing of the spheres in their housing when the hooks are operated. The centering devices also contribute to the radome's axial retention when the locking hooks apply their traction.

In this way the various means work together to allow the radome to be opened easily and rapidly while ensuring perfect evenness with the aircraft structure. In effect, the centering of the radome relative to the aircraft structure is ensured by the adaptability of its shape, provided by the slots (200, 100). Thus, the centering devices (40) can be mounted in adjustable receptacles (510) and consequently mounted without play. They can therefore effectively transfer the shear forces to the interface with the aircraft and thus permit the radome to be connected to the fuselage of said aircraft by a series of traction hook locks that can be operated quickly and easily.

Figure 7:
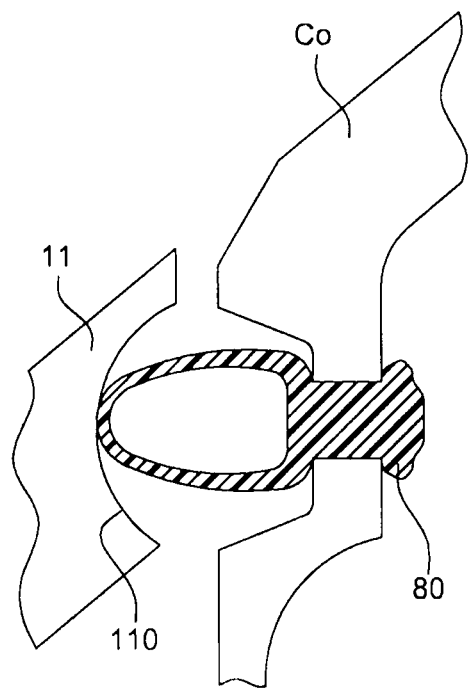
FIGS. 7 and 8 illustrate in cross-section two embodiments of the device for sealing the periphery of the radome at its end interfacing with the structure of the aircraft.
Figure 8:
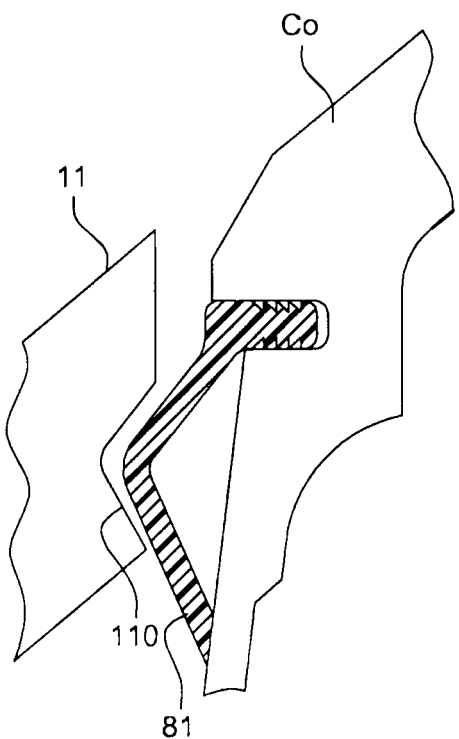

FIGS. 7 and 8: a seal (80, 81) is placed on the periphery of the interface between the aircraft structure and the radome's interface end. Preferably, the seal is fixed to the aircraft structure (CO) by clipping in a groove or holes made for this purpose in said structure. The other end of the seal (80,81) is housed in a groove (110) made perpendicular to the interface plane (10) in the monolithic portion (11) of the end of the radome. The action of the locks (20) bringing the end of the radome longitudinally closer to the aircraft structure crushes the seal in the groove, thus ensuring the hermeticity of the periphery of the radome, the seal being in addition protected in the groove (110).

Figure 9:
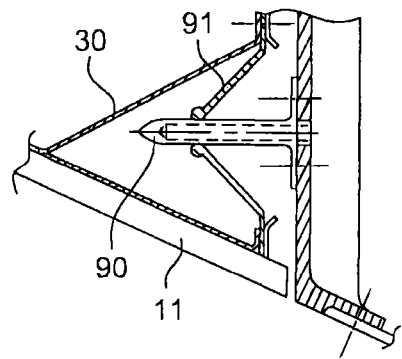
FIGS. 9 and 10 illustrate in cross-section along a radial plane two embodiments of the device for pre-centering the radome when it is fitted to the structure of the aircraft
Figure 10:
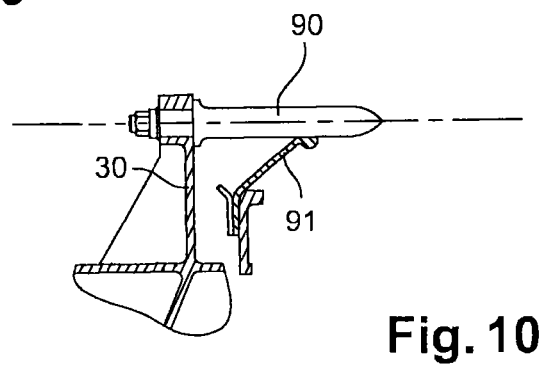

FIGS. 9 and 10: installing the radome (1) on the aircraft structure is made easier by the pre-centering devices. These pre-centering devices each comprise a pin (90) and a washer made of elastomer (91) comprising a central bore designed to receive said pin (90) and presenting sufficient radial flexibility to support the pin (90) being slightly offset in position and orientation relative to this bore. The pre-centering pins (90) can be installed on the aircraft structure and the elastomer washers (91) on the locking units, FIG. 9. Alternatively, FIG. 10: the pre-centering pin (90) is fixed to the locking unit (30) and the elastomer washer (91) to the aircraft structure. The length and position of the pins (90) and the elastomer washers (91) are such that the pins enter into the washers before the spherical centering devices enter into their receptacles. Advantageously at least 4 pre-centering devices of this type are placed and distributed around the circumference of the radome at the interface end.

Figure 11:
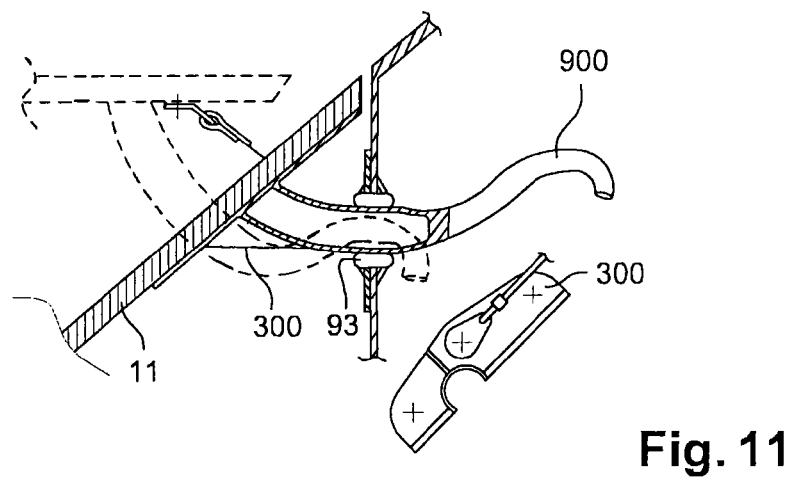
FIG. 11 represents a particular embodiment of the pins of the pre-centering device for a use of the said pins as hinges for opening the radome.

FIG. 11: according to an advantageous embodiment, two of the pre-centering pins (900), preferably located on the upper portion of the radome, have a hook shape and are fixed to the base of the corresponding locking unit (300). These special pins are centered in elastomer washers (93) having a reduced radial elasticity compared to those (91) receiving the other pre-centering pins (90). The special shape of these pins (900) means that they can be used as hinges for opening the radome, which can thus be opened so that the radar can be accessed without having to remove it.

The above description clearly illustrates that through its various features and their advantages the present invention realizes the objectives it set itself. In particular, the invention makes it possible to produce a radome that offers an improved quality of adjustment and evenness with the fuselage, retaining a possibility of rapid opening or removal with no disadvantage in terms of mass.

The invention claimed is:

1. Radome for an aircraft characterized in that it comprises a plurality of locking units able to bring together the opposing surfaces of the aircraft's fuselage and the radome, each unit comprising:
    locking means able to exercise a traction force on the surface of the fuselage, substantially normal to the surface, via attachment means;
    centering means able to withstand the substantially tangential shear forces to the opposing surfaces of the fuselage and radome;
    the locking means are placed such that they are located inside the cone of resulting forces on the centering means so as to minimize the bending stresses generated by the assembly in the radome.

2. Radome according to claim 1, characterized in that it comprises a longitudinal slot in its structure starting at the end interfacing with the fuselage.

3. Radome according to claim 1, characterized in that it comprises a plurality of longitudinal slots in its structure, starting at the end of the interface with the fuselage and distributed around the circumference of this end; the locking units each comprise a rigid support surface fixed to the radome and spanning both edges of a slot.

4. Radome according to claim 3, characterized in that it comprises, starting from the end interfacing with the fuselage, a monolithic peripheral area extending below each locking unit, the rest of the radome being formed of a honeycomb structure.

5. Radome according to claim 4, characterized in that the peripheral area comprises in the plane of the interface end a groove able to receive the end of a deformable seal fixed to the fuselage.

6. Radome according to claim 1, characterized in that the centering means consist of centering devices placed in a plane comprising the interface with the fuselage and fitting in a receptacle linked to the fuselage, when said radome is in the closed position.

7. Radome according to claim 6, characterized in that the locking means consist of a locking device with a hook which, in the locked position, exercises a force on a pin linked to the fuselage.

8. Radome according to claim 7, characterized in that the distance on the fuselage's longitudinal axis between the hook's connection point with the fuselage and the bearing point of the centering device on the locking unit is less than or equal to 30 mm.

9. Radome according to any one of the preceding claims, characterized in that at least two locking units comprise a device for pre-positioning the radome relative to the fuselage, consisting of a pin fitting into a washer made of elastomer.

10. Radome according to claim 9, characterized in that at least two of said pins have a hook shape designed to allow the radome to be articulated along an axis substantially parallel to the interface plane.

11. Method for producing a radome in a composite material according to claim 1, characterized in that it comprises steps consisting of:
    cutting slots by machining at the end of said radome;
    placing the end of the radome on a template and adjusting the shape and perimeter of the interface end to said template;
    fixing the locking units in line with each slot while the radome is on the template so as to freeze the shape of the end of said radome.

12. Method according to claim 11, characterized in that it comprises steps consisting of:
    Molding a composite structure in the shape of the radome consisting of two thermoplastic or thermosetting matrix composite panels separated by a honeycomb core
    Bonding a monolithic ring to the end of this structure.

13. Aircraft comprising a radome according to claim 1.

* * * * *